(12) United States Patent
Kwon et al.

(10) Patent No.: US 6,306,264 B1
(45) Date of Patent: Oct. 23, 2001

(54) METHOD FOR PRODUCING EXPANDED GRAPHITE

(75) Inventors: Young Bae Kwon, Taejon-Shi; Oh Yun Kwon, Chollanam-Do; Sang Won Choi, Chollanam-Do; Seung Won Kim, Chollanam-Do, all of (KR)

(73) Assignees: Korea Institute of Machinery and Materials; Yosu National University of Korea, both of (KR)

( * ) Notice: Subject to any disclaimer, the term of this patent is extended or adjusted under 35 U.S.C. 154(b) by 0 days.

(21) Appl. No.: 09/363,582

(22) Filed: Jul. 29, 1999

(51) Int. Cl.$^7$ .................................................... C01B 31/04
(52) U.S. Cl. ...................... 204/157.43; 423/448; 423/460
(58) Field of Search .................................... 423/448, 460, 423/439, 414, 266, 270; 204/157.43, 157.47

(56) References Cited

U.S. PATENT DOCUMENTS 4,091,083 * 5/1978 Hirschvogel et al. ............... 423/448

FOREIGN PATENT DOCUMENTS 58-74515  5/1983 (JP) .............................. C01B/31/04

* cited by examiner

Primary Examiner—Stuart L. Hendrickson
(74) Attorney, Agent, or Firm—Fish & Richardson P.C.

(57) ABSTRACT

Disclosed is a novel method for producing an expanded graphite which can be utilized for oil adsorbents, gaskets, packing sheets, adsorbents of volatile organic compounds and the like. $SO_3$-graphite interlayer compound is formed by contacting graphite particles with $SO_3$ generated from fuming sulfuric acid or anhydrous sulfuric acid. Excessive $SO_3$ condensed on $SO_3$-graphite interlayer compound is separated. Then, energy is applied to $SO_3$-graphite interlayer compound to expand the graphite. An acid containing a single component can be continuously reused thus reducing the amount of the acid to $1/10$–$1/100$ of that of an acid mixture used in the conventional method. As a result, the generation of a large amount of environmentally hazardous acid waste can be markedly reduced. Further, the concentration of sulfur remained in the expanded graphite also can be reduced, largely eliminating the corrosive effect of the expanded graphite onto metals when used for gaskets, packing sheets and the like.

2 Claims, No Drawings

METHOD FOR PRODUCING EXPANDED GRAPHITE

BACKGROUND OF THE INVENTION

1. Field of the Invention

The present invention relates to a method for producing an expanded graphite by using $SO_3$ gas produced from fuming sulfuric acid or anhydrous sulfuric acid.

2. Description of the Prior Art

Graphites are made of carbon atoms like coke and diamond, and the hexagonal structure of graphite forms a layer structure to give a specific lamellar crystal structure. When graphite is oxidized by using an appropriate oxidant, chemical ions such as $SO_3^{2-}$ and $NO_3-$ are introduced between the laminated layers to produce an interlayer compound. When thus obtained graphite is heated, the chemical ions in the interlayer compound become gases and the interlayer compound expands several hundred times to several thousand times of its original size due to the pressure of the generated gases. The c-axis of thus expanded graphite is from 20 to 250 times of c-axis of the common graphite.

Conventionally, expanded graphites are manufactured by oxidizing natural and/or pyrolyzed graphite with a mixture of sulfuric acid and oxidant, such as a mixture of sulfuric acid and nitric acid, sulfuric acid and potassium permanganate, sulfuric acid and hydrogenperoxide, or sulfuric acid and perchloric acid. The oxidized graphite is then washed with water and dried. The dried product is rapidly heated so that thus obtained graphite compound can expand to obtain the resulting expanded graphite.

The above-described conventional method will be described as follows. Japanese Patent Laid-Open No. sho 59-35078 discloses a method for producing an expanded graphite form. The expanded graphite is manufactured by impregnating the graphite with an acid mixture of 50% sulfuric acid and 60% perchloric acid in a ratio of 100:5 by weight and then heating the graphite at 1000° C.

Japanese Patent Laid-Open No. sho 61-72609 discloses a method for producing an expanded graphite by using sodium and tetrahydrofurane. The obtained expanded graphites are commonly used for a material for gasket, a composite material of cement and mortar, an expanded graphite sheet and the like. Additionally, expanded graphites obtained by using acid mixtures containing sulfuric acid as an oxidant and as a main intercalating agent have more specific use as a material for an expanded graphite sheet, an oil adsorbent and an inorganic fiber composite material as disclosed by U.S. Pat. No. 5,149,518. Alternatively, U.S. Pat. No. 5,503, 717 discloses a method of producing an expanded graphite by electrochemically immersing $ZnCl_2$ between the graphite layers in an aqueous solution and then heating thus obtained product.

However, in the above described conventional methods, graphite particles should be impregnated with a large amount of concentrated acid mixture (about 1.5 times of the amount of graphite particles) for a prolonged period of time. Consequently, the consuming amount of the acid mixture is very large while generating a large amount of waste acid. Moreover, since the waste acid contains various compounds of acids and oxidants, the treatment of the waste acid become a complicated task.

Due to these problems, the commercialization of these methods for producing the expanded graphite is difficult to implement. In addition, $SO_3$ gas and $SO_2$ gas generated during the producing process of the expanded graphite are environmentally hazardous agents. Further, sulfur remained within the expanded graphite cause corrosion of metals when the expanded graphite is applied to the packing, the gasket sheet and the like. Although these problems are not a factor for an expanded graphite manufactured by utilizing alkaline metal and hydrofuran and the electrochemical method utilizing $ZnCl_2$, the use of alkaline metal is expensive and a current having a current density of from 2000 to 5000 $A/m^2$ should be applied, hence increasing the energy consuming cost and so the manufacturing cost.

SUMMARY OF THE INVENTION

Accordingly, it is an object in the present invention to provide a novel method for producing an expanded graphite for a material for an oil adsorbent, a packing sheet and a volatile organic compound(VOCs) adsorbent, in which the expansion of granular graphite particles, using a single oxidant such as fuming sulfuric acid or anhydrous sulfuric acid, is implemented by contacting the graphite particles with $SO_3$ gas generated from fuming sulfuric acid or anhydrous sulfuric acid, and as a result, the amount of the consuming acid and hazardous waste acids along with manufacturing costs can be minimized and reduced by continuously recycling the sulfuric acid, while reducing remaining sulfur in the expanded graphite.

Another object of the present invention is to provide an oil adsorbent having an excellent adsorption property by utilizing the expanded graphite of the present invention.

To accomplish the above object, there is provided in the present invention a method for producing an expanded graphite comprising the steps of producing $SO_3$-graphite interlayer compound by contacting graphite particles with $SO_3$ gas generated from fuming sulfuric acid or anhydrous sulfuric acid, separating excessive amount of condensed $SO_3$ from the $SO_3$-graphite interlayer compound, and expanding the $SO_3$-graphite interlayer compound by applying energy thereto.

The other object of the present invention can be accomplished by an oil adsorbent comprising an expanded graphite manufactured by a method comprising the steps of producing $SO_3$-graphite interlayer compound by contacting graphite particles with $SO_3$ gas generated from fuming sulfuric acid or anhydrous sulfuric acid, separating excessive amount of condensed $SO_3$ from the $SO_3$-graphite interlayer compound, and expanding the $SO_3$-graphite interlayer compound by applying energy thereto.

DETAILED DESCRIPTION OF THE INVENTION

The present invention will be described in more detail below.

In the present invention, the graphite is expanded by forming a $SO_3$-graphite interlayer compound through introducing $SO_3$ between graphite layers by contacting the granular graphite particles with $SO_3$ gas generated from fuming sulfuric acid or anhydrous sulfuric acid and then applying energy to the $SO_3$-graphite interlayer compound by heat or exposing the resulting interlayer compound to microwave.

The fuming sulfuric acid or anhydrous sulfuric acid is used to oxidize the $SO_3$ the graphite in the present invention. After removing $SO_3$ remaining on the surface of the surface of the oxidized graphite particles, energy is applied to expand the resulting graphite. The amount of the waste acid can be minimized by absorbing $SO_3$ gas generated during the expansion process into the sulfuric acid and reusing thus obtained acid.

Further, since the waste acid generated in the present invention has a single chemical component, detoxification of the waste acid can be simply carried out by neutralization, and the product of the neutralization, that is, mirabilite ($Na_2SO_4$) is reusable. Hence, the method of the present invention is more economical and environmentally friendly than the conventional methods.

The amount of the oxidant having the single chemical component such as the fuming sulfuric acid or the anhydrous sulfuric acid according to the present invention can be reduced to $1/10$–$1/100$ compared to the amount of the oxidant used in the conventional methods. In addition, the oxidant according to the present invention can be continuously reused and the amount of the generated waste acid can be largely reduced. Thus, the present invention can resolve the difficult problem of treating the waste acid, which is prevalent in the conventional methods.

In the present invention, a reactor having the fuming sulfuric acid or anhydrous sulfuric acid is stood at room temperature or is heated to generate $SO_3$ gas. The preferred mixing ratio of the amount of the fuming sulfuric acid or anhydrous sulfuric acid to the amount of the graphite is 100:20–300 by weight. More preferably, the mixing ratio is 100:100–200 by weight.

The $SO_3$-graphite interlayer compound can be obtained by contacting the graphite particles with $SO_3$ gas for from about 10 minutes to 24 hours. The contacting time is significantly longer in a room temperature under normal atmospheric pressure while shorter under a pressurized condition. Therefore, the contacting time is not specifically limited. However, according to a repeated experiments by the present inventors, the above time range is applicable for the most cases. However, the contacting time out of the range provided above can also be applied as occasion needs.

On the surface of the obtained $SO_3$-graphite interlayer compound manufactured by contacting the graphite particles with the $SO_3$ gas generated from the fuming sulfuric acid or anhydrous sulfuric acid, excessive $SO_3$ condenses. For separating the condensed gas from the $SO_3$-graphite interlayer compound, the step of blowing air toward the compound, washing the compound with water, weakly heating the compound, exposing the compound to the microwave for the sonicator or the like can be applied.

At this time, the process for weakly heating the compound is implemented at about 50 to 80° C. for about 10 to 20 minutes and the process for exposing the compound to the microwave for the sonicator is implemented by exposing the compound to the microwave having the frequency of about 47 KHz with the output power of about 140 W in the sonicator for about 5 to 30 minutes.

The step of filtering the interlayer compound can be further implemented after washing the interlayer compound with water and/or exposing the compound to the microwave for the sonicator for completely removing the condensed $SO_3$. After that, the step of dispersing $SO_3$-graphite interlayer compound into water, exposing it to the microwave for the sonicator and then filtering can be further implemented.

The step of washing the interlayer compound with water and then filtering can also be implemented after weakly heating the compound for complete removal of the condensed $SO_3$. Then, the step of dispersing $SO_3$-graphite interlayer compound into water, exposing the interlayer compound to microwave for the sonicator and then filtering can be additionally implemented.

By implementing one process among the above-described various processes and filtering, the excessive $SO_3$ condensed on the surface of the $SO_3$-graphite interlayer compound can be removed, and the interlayer compound having $SO_3$ and $H_2O$ in crystal structure between the layers in an appropriate amount can be obtained.

Meantime, the separated $SO_3$ from the $SO_3$-graphite interlayer compound by the above described steps is recovered by absorbing $SO_3$ into the concentrated sulfuric acid. This acid can be used again as the applying source of $SO_3$ gas.

The application of energy for producing the expanded graphite can be preferably implemented by heating the $SO_3$-graphite interlayer compound at a temperature range of from about 400 to 800° C. under $O_2$ stream for about from 0.5 to 20 minutes. More preferably, the heating is implemented at a temperature range of from about 600 to 800° C. for about from 1 to 10 minutes.

Another method for applying the energy can be implemented by exposing the $SO_3$-graphite interlayer compound to microwave having a frequency of from about 1 to 5 GHz with an output power of from about 300 to 700 W for from about 0.5 to 3 minutes.

More preferably, the interlayer compound is exposed to microwave having a frequency of from about 2 to 5 GHz with an output power of from about 500 to 700 W for from about 1 to 2 minutes.

The preferred embodiments of the present invention will be described in more detail below. However, the present invention is not limited to the following examples. The densities of the expanded graphites obtained by the examples and comparative examples were measured by utilizing a pycnometer which is a container for measuring density and kerosene put on the market. Adsorbing amount of oil per 1g of the expanded graphite was determined by weighing 1 g of the expanded graphite at the room temperature, impregnating the weighed and expanded graphite into the kerosene, floating the expanded graphite on the surface of the kerosene, standing for 10 minutes, filtering and then by weighing the expanded graphite.

EXAMPLE 1

$SO_3$ gas generated by adding 100 g of fuming sulfuric acid into a reactor and then heating, was passed for 1 hour through a column in which 100 g of natural graphite granules was packed for the absorption of $SO_3$ into the natural graphite to obtain $SO_3$-graphite interlayer compound. The column containing thus obtained $SO_3$-graphite interlayer compound was weakly heated at about 60° C. for about 15 minutes to separate excessive amount of $SO_3$ condensed on the surface of the interlayer compound, and the separated $SO_3$ was recovered and absorbed into the sulfuric acid in the reactor. $SO_3$-graphite interlayer compound was washed with water and filtered. Then the compound was rapidly heated at 600° C. under $O_2$ stream for 10 minutes to obtain the expanded graphite according to the method of the present invention. The density, the amount of the remaining sulfur, and the absorbing amount of kerosene per g of the thus obtained expanded graphite were measured and illustrated in Table 1.

EXAMPLE 2

$SO_3$ gas generated by adding 100 g of fuming sulfuric acid into a reactor and then heating, was passed for 1 hour through a column in which 100 g of natural graphite granules was packed for the absorption of $SO_3$ into the natural graphite to obtain $SO_3$-graphite interlayer compound. The column containing thus obtained $SO_3$-graphite interlayer compound was weakly heated at about 60° C. for about 15 minutes to separate excessive amount of $SO_3$ condensed on the surface of the interlayer compound and the separated $SO_3$ was recovered and absorbed into the sulfuric acid in the reactor. $SO_3$-graphite interlayer compound was washed with water and filtered. Then the interlayer compound was dispersed into water and exposed to microwave for a sonicator for 20 minutes. The compound was rapidly heated at 600° C. under $O_2$ stream for 10 minutes to obtain the expanded graphite according to the method of the present invention. The density, the amount of the remaining sulfur, and the absorbing amount of kerosene per g of the thus obtained expanded graphite were measured and illustrated in Table 1.

EXAMPLE 3

$SO_3$ gas generated by adding 100 g of fuming sulfuric acid into a reactor and then heating, was absorbed by 200 g of natural granular graphite of 50–80 mesh packed into another reactor which is provided with a condenser at atmospheric pressure for 15 hours to produce $So_3$-graphite interlayer compound. Excessive $SO_3$ condensed on the surface of $SO_3$-graphite interlayer compound was separated by blowing air. The separated $SO_3$ was recovered by absorbing into concentrated sulfuric acid. Thus obtained interlayer compound was rapidly heated at 800° C. under $O_2$ stream for 1 minute to obtain the expanded graphite according to the method of the present invention. The density, the amount of the remaining sulfur, and the absorbing amount of kerosene per g of the thus obtained expanded graphite were measured and illustrated in Table 1.

EXAMPLE 4

$SO_3$ gas generated by adding 100 g of fuming sulfuric acid into a reactor and then heating, was absorbed by 200 g of natural granular graphite of 50–80 mesh packed into another reactor which is provided with a condenser at atmospheric pressure for 15 hours to produce $SO_3$-graphite interlayer compound. Thus obtained $SO_3$-graphite interlayer compound was dispersed into water and filtered. Thus obtained interlayer compound was rapidly heated at 800° C. under $O_2$ stream for 1 minute to obtain the expanded graphite according to the method of the present invention. The density, the amount of the remaining sulfur, and the absorbing amount of kerosene per g of the thus obtained expanded graphite were measured and illustrated in Table 1.

EXAMPLE 5

$SO_3$ gas generated by adding 100 g of fuming sulfuric acid into a reactor and then heating, was absorbed by 200 g of natural granular graphite of 50–80 mesh packed into another reactor which is provided with a condenser at atmospheric pressure for 15 hours to produce $SO_3$-graphite interlayer compound. Thus obtained $SO_3$-graphite interlayer compound was dispersed into water and put into a sonicator. Then, the interlayer compound was exposed to microwave having a frequency of 47 KHz with an output power of 140 W for about 20 minutes and then filtered. Thus obtained interlayer compound was rapidly heated at 800° C. under $O_2$ stream for 1 minute to obtain the expanded graphite according to the method of the present invention. The density, the amount of the remaining sulfur, and the absorbing amount of kerosene per g of the thus obtained expanded graphite were measured and illustrated in Table 1.

EXAMPLE 6

$SO_3$ gas generated by adding 100 g of fuming sulfuric acid into a reactor and then heating, was absorbed by 200 g of natural granular graphite of 50–80 mesh packed into another reactor which is provided with a condenser at atmospheric pressure for 15 hours to produce $SO_3$-graphite interlayer compound. Thus obtained $SO_3$-graphite interlayer compound was dispersed into water and put into a sonicator. Then, the interlayer compound was exposed to microwave having a frequency of 47 KHz with an output power of 140 W for about 20 minutes and then filtered. Thus obtained interlayer compound was exposed to microwave having a frequency of 2.45 GHz with an output power of 700 W for 1 minute to obtain the expanded graphite according to the method of the present invention. The density, the amount of the remaining sulfur, and the absorbing amount of kerosene per g of the thus obtained expanded graphite were measured and illustrated in Table 1.

EXAMPLE 7

Two reactors made of hard glass were connected by means of a valve. 100 g of fuming sulfuric acid was added into one reactor, and 200 g of natural granular graphite of 50–80 mesh was added into the other reactor. The two reactors were completely sealed. The valve between the reactors was opened and the fuming sulfuric acid was heated to 100° C. for 5 hours to maintain its own vapor pressure. After 5 hours, the heating was stopped and the valve was closed to obtain $SO_3$-graphite interlayer compound. Air was blown into the reactor containing $SO_3$-graphite interlayer compound for separating excessive $SO_3$ condensed on the surface of thus obtained $SO_3$-graphite interlayer compound. The separated $SO_3$ was absorbed by concentrated sulfuric acid for a recovering. Thus obtained interlayer compound was rapidly heated at 800° C. under $O_2$ stream for 1 minute to obtain the expanded graphite according to the method of the present invention. The density, the amount of the remaining sulfur, and the absorbing amount of kerosene per g of the thus obtained expanded graphite were measured and illustrated in Table 1.

EXAMPLE 8

Two reactors made of hard glass were connected by means of a valve. 100 g of fuming sulfuric acid was added into one reactor, and 200 g of natural granular graphite of 50–80 mesh was added into the other reactor. The two reactors were completely sealed. The valve between the reactors was opened and the fuming sulfuric acid was heated to 100° C. for 5 hours to maintain its own vapor pressure. After 5 hours, the heating was stopped and the valve was closed to obtain $SO_3$-graphite interlayer compound. Thus obtained $SO_3$-graphite interlayer compound was dispersed into water and put into a sonicator. Then, the compound was exposed to microwave having a frequency of 47 KHz with an output power of 140 W for about 20 minutes and then filtered. Thus obtained interlayer compound was rapidly heated at 800° C. under $O_2$ stream for 1 minute to obtain the expanded graphite according to the method of the present invention. The density, the amount of the remaining sulfur, and the absorbing amount of kerosene per g of the thus obtained expanded graphite were measured and illustrated in Table 1.

EXAMPLE 9

Two reactors made of hard glass were connected by means of a valve. 100 g of fuming sulfuric acid was added into one reactor, and 200 g of natural granular graphite of 50–80 mesh was added into the other reactor. The two reactors were completely sealed. The valve between the reactors was opened and the fuming sulfuric acid was heated to 100° C. for 5 hours to maintain its own vapor pressure. After 5 hours, the heating was stopped and the valve was closed to obtain $SO_3$-graphite interlayer compound. Thus obtained $SO_3$-graphite interlayer compound was dispersed into water and put into a sonicator. Then, the interlayer compound was exposed to microwave having a frequency of 47 KHz with an output power of 140 W for about 20 minutes and then filtered. Thus obtained interlayer compound was exposed to microwave having the frequency of 2.45 GHz with the output power of 700 W for 1 minute to obtain the expanded graphite according to the method of the present invention. The density, the amount of the remaining sulfur, and the absorbing amount of kerosene per g of the thus obtained expanded graphite were measured and illustrated in Table 1.

Comparative Example 1

For judging the effects of the method according to the present invention with respect to the conventional method, an expanded graphite was produced by utilizing an acid mixture according to the conventional method. That is, 150 g of natural granular graphite of 50–80 mesh was impregnated into an acid mixture of 400 g of 95% sulfuric acid and 200 g of 62% nitric acid, and stood for 15 hours at room temperature to obtain $SO_3$-graphite interlayer compound. Thus obtained interlayer compound was filtered and sufficiently washed with water. Thus obtained interlayer compound was rapidly heated at 800° C. under O2 stream for 1 minute to manufacture the expanded graphite according to the conventional method. The density, the amount of the remaining sulfur, and the absorbing amount of kerosene per g of the thus obtained expanded graphite were measured and illustrated in Table 2.

Comparative Example 2

An expanded graphite was obtained by the same manner described in Comparative Example 1 except that the acid mixture was obtained by mixing 50% sulfuric acid and 60% hydrogenperoxide in a mixing ratio of 100:5 by weight. The density, the amount of the remaining sulfur, and the absorbing amount of kerosene per g of the thus obtained expanded graphite were measured and illustrated in Table 2.

TABLE 1

Density, amount of remaining sulfur, and absorbing amount of kerosene per g of the expanded graphite according to the method of the present invention

| | single component acid | expanded graphite density (g/cm³) | residual sulfur amount (ppm) | kerosene adsorbing amount per g (g) |
|---|---|---|---|---|
| example 1 | fuming sulfuric acid | 0.005 | 1000 | 39.8 |
| example 2 | fuming sulfuric acid | 0.005 | 200 | 48.1 |
| example 3 | fuming sulfuric acid | 0.004 | 800 | 38.1 |
| example 4 | fuming sulfuric acid | 0.005 | 500 | 40.1 |
| example 5 | fuming sulfuric acid | 0.005 | 500 | 40.1 |
| example 6 | fuming sulfuric acid | 0.006 | 200 | 38.5 |
| example 7 | fuming sulfuric acid | 0.004 | 700 | 35.0 |
| example 8 | fuming sulfuric acid | 0.006 | 150 | 41.0 |
| example 9 | fuming sulfuric acid | 0.004 | 100 | 40.0 |

TABLE 2

Density, amount of remaining sulfur, and absorbing amount of kerosene per g of the expanded graphite according to the conventional method

| | components in acid | expanded graphite density (g/cm³) | residual sulfur amount (ppm) | kerosene adsorbing amount per g (g) |
|---|---|---|---|---|
| comparative example 1 | sulfuric acid and nitric acid | 0.008 | 1200 | 36.5 |
| comparative example 2 | sulfuric acid and hydrogenperoxide | 0.008 | 1600 | 37.6 |

From Tables 1 and 2, it can be noticed that the expanded graphite manufactured by examples 1–9 has the density of from 0.004 to 0.006 g/cm³ and the amount of sulfur remaining on the expanded graphite of the present invention is reduced to 1/5–1/10 of that of the conventional expanded graphite. In addition, it can be confirmed that 1 g of the expanded graphite obtained by the present invention adsorbs 10 to 100 g of kerosene.

According to the method of the present invention, the difficult problem which arises from detoxifying the acid mixture in the conventional technique can be resolved. As a result, the method described by the present invention markedly reduce environmentally hazardous chemicals, while providing expanded graphites having similar physical characteristics to the expanded graphite obtained by the conventional method.

The expanded graphite of the present invention can be utilized as a raw material for manufacturing oil adsorbent, gasket, packing, cushion sheet and the like, and can be advantageously used as an adsorbent of volatile organic compounds.

In the present invention, the oxidant used for obtaining the expanded graphite is not an acid mixture but an acid having a single component and the amount of the acid can be reduced to 1/10–1/100 of that of the conventionally used acids. In the steps of producing the expanded graphite, the process of impregnating the graphite into the acid is eliminated, rather graphite granules are exposed to $SO_3$ gas generated from fuming sulfuric acid or anhydrous sulfuric acid. As a result, the residual acid is nearly pure and it can be reused and almost no acid waste is exhausted, solving the complex problem of treating the acid waste which accompany the conventional techniques.

Additionally, the amount of the residual sulfur in the expanded graphite can be reduced to $1/5$–$1/10$ compared to the expanded graphite prepared by the conventional method, eliminating its corrosive effect on metals. Hence, its industrial application in oil adsorbents, gaskets, packing sheets and the like can be expanded.

While the present invention is described in detail referring to the attached examples, it is to be understood that the invention is capable of use in various other combinations and environments and is capable of changes or modification within the scope of the inventive concept as expressed herein.

What is claimed is:

1. A method for producing an expanded graphite, comprising the steps of:

generating $SO_3$ gas from fuming sulfuric acid or anhydrous sulfuric acid;

contacting graphite particles with said $SO_3$ gas to produce a $SO_3$-graphite interlayer compound;

separating excess $SO_3$ from said $SO_3$-graphite interlayer compound by exposing said compound to a microwave having a frequency of 47 MHz with an output power of 140 W in a sonicator for about 5 to 30 minutes; and expanding said $SO_3$-graphite interlayer compound by applying energy thereto.

2. A method of producing an expanded graphite, comprising the steps of:

generating $SO_3$ gas from fuming sulfuric acid or anhydrous sulfuric acid;

contacting graphite particles with said $SO_3$ gas to produce a $SO_3$-graphite interlayer compound, the mixing ratio of the amount of said fuming sulfuric acid or said anhydrous acid to the amount of said graphite being in the range of about 100:20–300 by weight;

separating excess $SO_3$ from said $SO_3$-graphite interlayer compound by exposing said compound to a microwave having a frequency of 47 MHz with an output power of 140 W in a sonicator for about 5 to 30 minutes; and expanding said $SO_3$-graphite interlayer compound by applying energy thereto.

* * * * *